United States Patent [19]  [11] 3,800,271
Stillman, Jr.  [45] Mar. 26, 1974

[54] UNDERWATER SIGNALLING SYSTEM
[75] Inventor: Stephen L. Stillman, Jr., Hollis, N.H.
[73] Assignee: Sanders Associates, Inc., Nashua, N.H.
[22] Filed: Mar. 9, 1973
[21] Appl. No.: 339,786

[52] U.S. Cl............................ 340/2, 9/8 R, 340/8 S
[51] Int. Cl. ...................... B63b 21/00, H04b 11/00
[58] Field of Search .................. 340/2, 85, 9; 9/8 R

[56] References Cited
UNITED STATES PATENTS
3,141,148   7/1964   Hueter................................ 340/8 S
3,541,498   11/1970  Dale et al. .............................. 340/2

*Primary Examiner*—Richard A. Farley

[57] ABSTRACT

An underwater signalling system which can be retrieved and stored readily is described. The system includes a surface float connected by a compliant cable to an underwater housing having two hollow portions. A transducer cable, with transducers attached, extends from the housing and terminates in a drag member. Both cables are provided with a series of rings along their length fastened by their rims. A thin retrieving cable is fastened to the drag member and is threaded through the rings, the housing and through a passageway completely through the float and is terminated in a loop. To retrieve the system, the loop is engaged and raised whereupon the rings constrain the cables to form into loops which enter opposite ends of the hollow housing. The drag member engages the bottom of the housing and the float engages the top, thereby completely enclosing the cables and transducers. The assembly may then be lifted as a unit by the retrieving cable.

9 Claims, 6 Drawing Figures

PATENTED MAR 26 1974 3,800,271
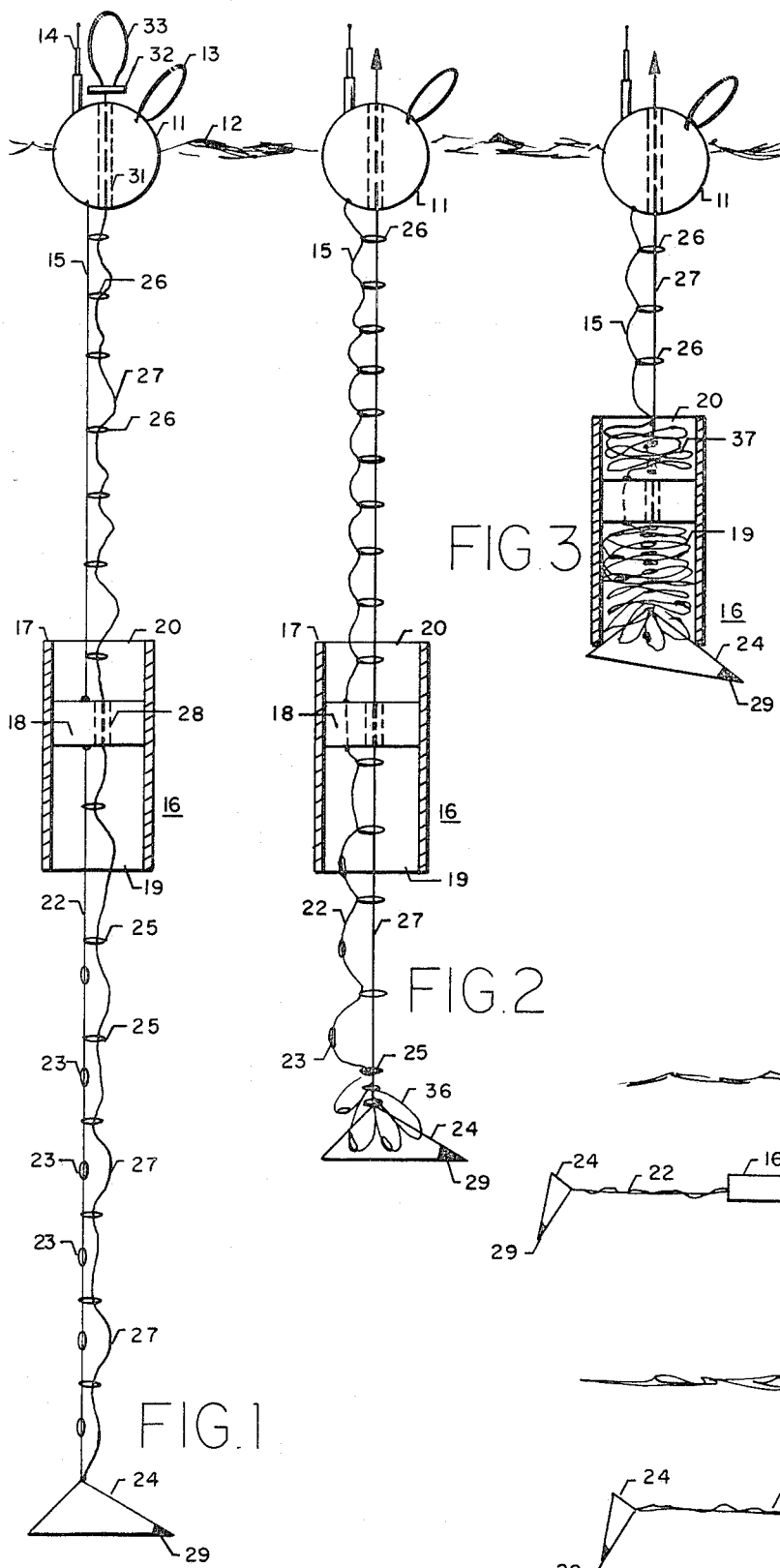
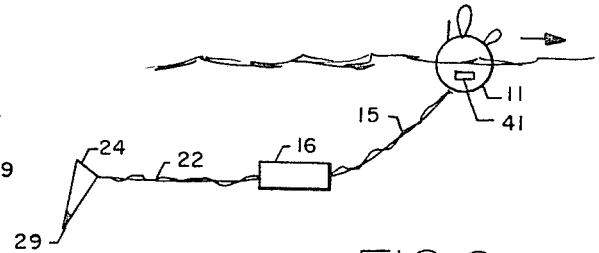
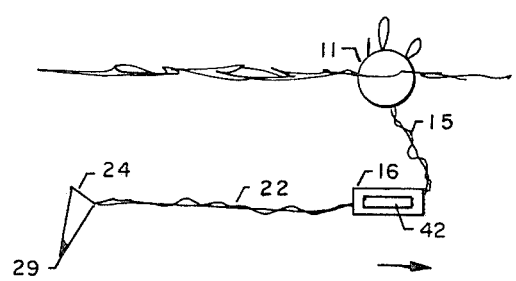

UNDERWATER SIGNALLING SYSTEM

FIELD OF THE INVENTION

This invention relates generally to underwater signal transmitting and/or receiving apparatus and particularly to methods and means for storing, deploying and retrieving such apparatus.

BACKGROUND OF THE INVENTION

In the past, arrays of signal transducers for transmitting and/or receiving signals have been deployed beneath the surface of the sea in many ways. Some systems are deployed but once and are scuttled after a predetermined period of use. Typically, such arrays are supported by a surface and/or a subsurface float, with or without an anchor. Another class of arrays are those which are deployed, used, retrieved and redeployed at a new location. An example of the latter class is a towed array. Typically the transducer cable, which includes signal and power conductors, is wound up on a winch on board a helicopter with the transducers attached. In use, the array is lowered into the water with the end of the cable remaining attached to the winch. The helicopter then tows the array slowly beneath the surface. At the end of the mission the cable is again wound up on the winch and is ready to be deployed in a new position. This arrangement has several disadvantages, among them being the large space occupied by the cable when wound on the winch, the monopolization of the winch by a single array, and the necessity for the presence of the helicopter not only during deployment and retrieval but during operation. The apparatus of the present invention is not, strictly speaking, a towed array but it is an outgrowth of work directed toward alleviating the storage problem of the towed array and the necessity for the continuous presence of the helicopter.

It is a general object of the present invention to provide improved methods and apparatus for storing, deploying and retrieving an array of transducers.

Another object is to provide improved apparatus for storing an array when it is not in use.

SUMMARY OF THE INVENTION

Briefly stated, a system incorporating the invention includes a plurality of rings fastened by their rims to the transducer cable in spaced apart relationship. A thin auxiliary retrieving cable is threaded through the rings. The lower ends of both cables are fastened to a drag member. When the upper end of the retrieving cable is raised, it raises the drag member and in so doing, the transducer cable, with the transducers attached, is formed into loops on the surface of the drag member. The upper end of the transducer cable is fastened to a partially hollow housing through which the retrieving cable passes freely. Continued raising of the retrieving cable causes the transducer cable with the transducers attached to enter the housing, the open end of which is closed by the drag member. A similar arrangement of rings is provided on the cable between the housing and the surface float with the result that this cable is folded into the upper end of the housing.

DESCRIPTION OF PREFERRED EMBODIMENT

For a clearer understanding of the invention reference may be made to the following detailed description and the accompanying drawing in which:

FIG. 1 is a schematic diagram of a signal transmitting and/or receiving system deployed in the sea for operation;

FIG. 2 is a schematic diagram similar to FIG. 1 but showing the system in an early stage of retrieval;

FIG. 3 is a schematic diagram similar to FIG. 2 showing the system in a later stage of retrieval;

FIG. 4 is a schematic diagram showing the system completely retrieved and stored;

FIG. 5 is a schematic diagram showing one way in which the array may be deployed approximately horizontally; and FIG. 6 is a schematic diagram showing another way in which the array may be deployed approximately horizontally.

Referring first to FIG. 1, there is shown a generally spherical buoyant float 11 on the surface 12 of the sea. A loop 13 of stiff cable or the like is fastened to the top of float 11 for engagement by a hook to raise it. The float 11 may contain an electronic package (not shown) comprising such components as a transmitter, a receiver, amplifiers, power supplies, logic circuits and the like which cooperate with the transducers to be described. A retractable antenna 14 protrudes from the top of the float and is for transmitting and/or receiving information. A highly compliant cable 15 has one end mechanically fastened to the float 11 and includes conductors connected to the electronic package for conveying signals and power to and from the transducers. The other end of the cable 15 is fastened to a housing indicated generally by the reference character 16. The cable 15 is capable of substantial extension and contraction so that the float 11 may follow the surface waves without unduly disturbing the housing 16. This housing comprises a hollow cylindrical shell 17 and an inner, intermediate portion 18 which separates the housing into two hollow portions 19 and 20. The cable 15 is mechanically fastened to the top of the intermediate portion 18, which may or may not contain part of the electronics of the system. If it does, the conductors of the cable 15 are connected to the electronics. Otherwise, they are connected directly to the conductors of a transducer cable 22 the upper end of which is mechanically fastened to the bottom of the intermediate portion and which extends therefrom. A plurality of electroacoustic transducers 23, such as hydrophones, are connected to the cable 22 with predetermined distances between them to comprise a suitable array. The lower end of the cable 22 is fastened to the vertex of a generally conically shaped drag member 24 which is preferably slightly unsymmetrical, as shown, rather than of right circular shape. A small weight 29 is fastened in the furthest extending portion, as shown.

A first group of rings 25 are each fastened by their rims to the transducer cable 22 and are spaced apart by distances which are preferably not greater than the inside diameter of the hollow portions 19 and 20. Each ring is preferably approximately circular and has a smooth surface free of rough or sharp edges. A second group of similar rings 26 are each fastened to the compliant cable 15 and are spaced apart by like distances, measured when the cable 15 is unstretched. A retrieving cable 27 is fastened to the vertex of the drag member 24 and extends upward through each of the rings 25 and into the hollow portion 19. The cable 27 is thin, strong and smooth and is preferably of plastic coated steel. The intermediate portion 18 of the housing 16 includes a longitudinal passageway 28, which may, for example be defined by a hollow tube. The retrieving cable 27 extends upward through the passageway 28, through the hollow portion 20 and through each of the rings 26. The float 11 also includes a passageway 31 completely therethrough which may also be defined by a hollow tube. The retrieving cable 27 extends upward through this passageway and, at the top, is fitted with a stop member 32 which prevents the cable from falling or being pulled through the passageway 31. The upper end of the cable 27, above the stop member 32, is formed into, or fitted with, a loop 33 which may be engaged by a hook (not shown) on the end of a winch cable on board a helicopter.

FIG. 1 shows the apparatus after it has been deployed and after it has been detached from the surface vessel or aircraft which deployed it. The float 11 is on the surface and the compliant cable 15 is partially stretched and is long enough to support the housing 16 at a depth sufficient to be substantially unaffected by wave motion at the surface. As the float 11 follows the waves, the cable 15 extends and contracts so that the housing 16 remains substantially stationary. The transducer cable 22 is supported by the housing 16 in an approximately vertical position and the transducers 23 are in position to transmit and/or receive signals. The length of the retrieving cable 27 is greater than the length of the transducer cable 22 plus the maximum extended length of the compliant cable 15, so that, as shown in FIG. 1, it normally remains slack and does not interfere with the motion of the float 11 as it follows the waves.

When it is desired to retrieve the apparatus, the helicopter is maneuvered so that the hook on the end of its winch cable engages the loop 33. The loop is drawn upward by the upward movement of the aircraft and/or by the operation of its winch. Initially, the slack is taken out of the retrieving cable 27 and then the conical drag member 24 is raised. As shown in FIG. 2, the transducer cable 22 becomes slack and is constrained by the rings 25 to form itself into loops 36 which are disposed on and above the upper surface of the drag member 24. As the retrieving cable 27 is raised further, the transducer cable 22 with the transducers attached is drawn into the lower hollow portion 19 as shown in FIG. 3. Further raising of the cable 27 causes the member 24 to engage the hollow shell 17 thus covering the hollow portion 19. Next the housing 16 is raised and the cable 15 is constrained by the rings 26 to form itself into loops 37 within the upper hollow portion 20. Finally, as shown in FIG. 4, the housing 16 engages the surface of the float 11 and continued raising of the cable 27 raises the entire assembly as a unit. It may then be stored at any convenient location within the helicopter with the cables 15 and 22 and the transducers 23 completely enclosed. The loop 13 enables the assembly to be picked up independently of the retrieving cable 27.

Since the retrieving cable 27 is a single, thin cable, it occupies much less space per unit length than the compliant cable 15 and the transducer cable 22 each of which necessarily includes many insulated conductors. Accordingly, the cable 27 can be wound up on a much smaller drum than was formerly required. There are many ways that it can be handled but it is preferred at present that the helicopter winch be provided with a small detachable drum either in place of or in addition to the normal drum. Then this drum can be detached from the winch and stored alongside the remainder of the assembly. Alternatively, after the assembly has been retrieved, the cable 27 may be unwound from the helicopter's winch and wound up on another drum for storage. Another arrangement is to make the cable 27 in two pieces, the first just long enough to extend from the drag member 27 to the top of the float 11 when the parts are assembled as shown in FIG. 4. In such a case, a coupling (not shown) is provided which is small enough and smooth enough to pass through the rings 25 and 26 without danger of snagging. However, the details of the arrangements for storing the retrieving cable 27 are not a part of the present invention and will not be discussed further herein.

The relative sizes of the float 11, housing 16 and drag member 24 may be approximately as shown in the drawing. None of the dimensions are critical provided that the diameters of the float 11 and the base of the drag member 24 are greater than the inside diameter of the housing 16. It is not essential that the float 11 be spherical although it is preferred at present that at least the bottom surface be spherical. Similarly, the drag member 24 need not be conical although the conical shape is preferred at present because this shape aids in the formation of the loops 36 in the cable 22 and provides a convenient closure for the hollow portion 19. Additionally, a conical shape, or something similar, is important when the array is deployed in a horizontal attitude.

FIG. 1 has shown the array of transducers 23 arranged in an approximately vertical line. It is often desired to arrange them horizontally, and this may be accomplished as shown in FIG. 5. A small thruster 41 is attached to or incorporated within the float 11. Such a thruster is simply a small motor driven propeller which drives the float 11 slowly along the surface. The conical member 24 provides enough drag to extend the cable 22 in an approximately horizontal line beneath the surface as shown in FIG. 5 while the cable 15 extends from the housing 16 to the float 11.

FIG. 6 shows another arrangement in which a thruster 42 is fastened to or incorporated within the housing 16 with a similar result except that the cable 15 extends slightly backwards from the housing 16 to the float 11.

As previously noted and illustrated, the loop 13 of the float 11 is off center with respect to the supporting cable; the two cables are fastened to the housing 16 at a point displaced from the center; and the drag member 24 is unsymmetrical. Due to these intentionally off center tow points, rotation of one of these parts with respect to another is prevented as long as these components are aligned into either moving water or air, thus preventing twisting and the winding of one of the cables upon the other.

Although a preferred embodiment of the invention has been described in considerable detail for illustrative purposes, many modifications will occur to those skilled in the art. It is therefore desired that the protection afforded by Letters Patent be limited only by the true scope of the appended claims.

What is claimed is:

1. An underwater signaling system including a transducer cable, a plurality of transducers connected to said cable, a surface float, a compliant cable interconnecting said surface float and one end of said transducer cable, and a drag member connected to the other end of said transducer cable, characterized in that said system includes a generally cylindrical hollow housing having an intermediate portion separating first and second hollow portions at opposite ends thereof, said intermediate portion being formed with a small passageway therethrough, and in that said transducer cable extends through said first hollow portion and is connected to said intermediate portion and in that said compliant cable extends through said second hollow portion and is connected to said intermediate portion, and in that said system also includes a first group of rings each fastened by its rim to said transducer cable, a second group of rings each fastened by its rim to said compliant cable, a retrieving cable fastened to said drag member and passing successively through the rings of said first group, through the passageway in said intermediate portion, through the rings of said second group and through a passageway formed in said float to the top thereof, whereby when said system is deployed in the sea said float remains on the surface with said cables extending therefrom and whereby raising the upper end of said retrieving cable when said system is so deployed causes said transducer cable with the transducers attached to be disposed in loops on the surface of said drag member and causes said drag member to engage said first hollow portion with said loops within and causes said compliant cable to lie in loops within said second hollow portion and causes said second hollow portion to engage the surface of said float.

2. An underwater signaling system in accordance with claim 1 in which the length of said retrieving cable is greater than the length of said transducer cable plus the maximum extended length of said compliant cable.

3. An underwater signaling system in accordance with claim 1 in which the rings of said first group are spaced apart by a distance not greater than the inside diameter of said housing and in which the rings of said second group are spaced apart by a like distance measured when said compliant cable is unstretched.

4. An underwater signaling system in accordance with claim 1 in which said drag member is conical in shape and has a base with a diameter greater than the inside diameter of said housing and in which said transducer cable and said retrieving cable are fastened to the vertex thereof.

5. An underwater signaling system in accordance with claim 1 which includes a loop on that end of said retrieving cable which extends above said float.

6. An underwater signaling system in accordance with claim 1 which includes a stop member fitted to said retrieving cable at a point above said float.

7. An underwater signaling system in accordance with claim 1 in which said transducers are electroacoustic transducers.

8. An underwater signaling system in accordance with claim 1 in which said float is formed with a spherical surface on the bottom thereof having a diameter greater than the inside diameter of said housing.

9. An underwater signaling system in accordance with claim 1 which includes a loop fastened to the top of said float.

* * * * *